（12）United States Patent
Jin et al.

(10) Patent No.: US 11,132,088 B2
(45) Date of Patent: Sep. 28, 2021

(54) METHOD FOR OBTAINING BACKGROUND INFORMATION AND ELECTRONIC DEVICE SUPPORTING THE SAME

(71) Applicant: Samsung Electronics Co., Ltd., Suwon-si (KR)

(72) Inventors: Yunjang Jin, Suwon-si (KR); Suna Kim, Suwon-si (KR); Chihyun Cho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/795,477

(22) Filed: Feb. 19, 2020

(65) Prior Publication Data

US 2020/0264755 A1 Aug. 20, 2020

(30) Foreign Application Priority Data

Feb. 19, 2019 (KR) .................. 10-2019-0019562

(51) Int. Cl.
*G06F 3/041* (2006.01)
*G06K 9/00* (2006.01)

(52) U.S. Cl.
CPC ........ *G06F 3/04182* (2019.05); *G06F 3/0412* (2013.01); *G06K 9/0002* (2013.01); *G06K 9/00033* (2013.01)

(58) Field of Classification Search
CPC .. G06F 3/0412; G06F 3/04182; G06F 1/3231; G06F 1/3234; G06F 1/3278; G06K 9/0002; G06K 9/00033; H04B 1/3838; H04B 1/3888; H04M 1/04; H04M 1/0202; H04M 1/185; Y02D 10/00; A45C 11/00; A45C 13/00; A45C 13/002; A45C 13/04;

(Continued)

(56) References Cited

U.S. PATENT DOCUMENTS 6,798,335 B2    9/2004  Miyashita et al.
10,139,887 B2  11/2018  Lee
2014/0085815 A1  3/2014  Filipovic et al.
(Continued)

FOREIGN PATENT DOCUMENTS

CN          105988696 A     10/2016

OTHER PUBLICATIONS

International Search Report and Written Opinion of the International Searching Authority in connection with International Application No. PCT/KR2020/001841 dated Jun. 11, 2020, 10 pages.

*Primary Examiner* — Nelson M Rosario

(57) ABSTRACT

An electronic device includes a housing including a first plate facing a first direction, a second plate facing a second direction opposite to the first direction, and a side member disposed in at least part of a peripheral region between the first plate and the second plate, a touch screen display having at least a portion exposed through the first plate of the housing, a fingerprint sensor disposed in a lower portion of the touch screen display, and a cover case that is coupled or integrated with at least part of the housing and that opens or closes the first plate of the housing. An air gap is formed between a first region of the touch screen display that corresponds to the fingerprint sensor and a second region of the cover case that faces at least the first region, with the cover case closing the first plate of the housing.

20 Claims, 13 Drawing Sheets

(58) Field of Classification Search
CPC .............. A45C 15/00; A45C 2011/002; A45C 2011/003; H05K 5/02
See application file for complete search history.

(56) References Cited

U.S. PATENT DOCUMENTS

| | | |
|---|---|---|
| 2014/0087788 A1 | 3/2014 | Filipovic et al. |
| 2014/0306553 A1* | 10/2014 | Lee ........................ G06F 1/3278 307/326 |
| 2015/0227377 A1 | 8/2015 | Park et al. |
| 2017/0068290 A1 | 3/2017 | Filipovic et al. |
| 2017/0127780 A1* | 5/2017 | Pakr ......................... A45F 5/00 |
| 2017/0185419 A1 | 6/2017 | Park et al. |
| 2018/0136945 A1 | 5/2018 | Park et al. |
| 2018/0164847 A1* | 6/2018 | Igarashi ................ H04M 1/185 |
| 2018/0368270 A1 | 12/2018 | Seo et al. |

* cited by examiner

METHOD FOR OBTAINING BACKGROUND INFORMATION AND ELECTRONIC DEVICE SUPPORTING THE SAME

CROSS-REFERENCE TO RELATED APPLICATION

This application is based on and claims priority under 35 U.S.C. § 119 to Korean Patent Application No. 10-2019-0019562, filed on Feb. 19, 2019, in the Korean Intellectual Property Office, the disclosure of which is incorporated by reference herein its entirety.

BACKGROUND

1. Field

The disclosure relates to a method for obtaining background information and an electronic device supporting the same.

2. Description of Related Art

A recent electronic device may operate sensitive and private information resources such as personal information or financial information. Accordingly, a high-level security policy is required for the electronic device, and as a part of the effort, a biometric authentication system based on a unique physical characteristic of a user is embedded in the electronic device. Among various biometric authentication systems, the fingerprint authentication technology using user fingerprint information is employed as a general biometric authentication means due to its relatively high security and user convenience in operation.

The above information is presented as background information only to assist with an understanding of the disclosure. No determination has been made, and no assertion is made, as to whether any of the above might be applicable as prior art with regard to the disclosure.

SUMMARY

The electronic device may generate a fingerprint image based on fingerprint information of the user's body (e.g., a finger) that is brought into contact with a fingerprint sensing region and may perform correction to remove noise from the fingerprint image. For example, the electronic device may generate a background image using background information obtained in the state in which any object is not brought into contact with the fingerprint sensing region, and may remove noise from the fingerprint image by comparing the background image and the fingerprint image. In this regard, the electronic device may periodically or aperiodically obtain and collect various pieces of background information resulting from the generation of the background image. However, when an object such as a cover case included in the electronic device is brought into contact with the fingerprint sensing region, the electronic device may obtain invalid background information, or may generate an invalid background image.

Aspects of the disclosure are to address at least the above-mentioned problems and/or disadvantages and to provide at least the advantages described below. Accordingly, an aspect of the disclosure is to provide an electronic device including a cover case structurally improved in relation to acquisition of valid background information and a method for obtaining background information by the electronic device based on the cover case structure.

In accordance with an aspect of the disclosure, an electronic device includes a housing including a first plate that faces a first direction, a second plate that faces a second direction opposite to the first direction, and a side member disposed in at least part of a peripheral region between the first plate and the second plate, a touch screen display, at least part of which is exposed through the first plate of the housing, a fingerprint sensor disposed in a lower portion of the touch screen display, and a cover case that is coupled or integrated with at least part of the housing and that opens or closes the first plate of the housing. An air gap is formed between a first region of the touch screen display that corresponds to the fingerprint sensor and a second region of the cover case that faces at least the first region, with the cover case closing the first plate of the housing.

According to the various embodiments, the cover case included in the electronic device may avoid contact with the fingerprint sensing region of the electronic device, and the electronic device may obtain reliable background information through the fingerprint sensing region.

According to the various embodiments, the electronic device including the cover case may obtain background information through the fingerprint sensing region, based on state information of the cover case.

In addition, the disclosure may provide various effects that are directly or indirectly recognized.

While the disclosure has been shown and described with reference to various embodiments thereof, it will be understood by those skilled in the art that various changes in form and details may be made therein without departing from the spirit and scope of the disclosure as defined by the appended claims and their equivalents.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

With regard to the description of the drawings, identical or similar reference numerals may be used to refer to identical or similar components.

DETAILED DESCRIPTION

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to the accompanying drawings. However, those of ordinary skill in the art will recognize that modification, equivalent, and/or alternative on the various embodiments described herein can be variously made without departing from the scope and spirit of the disclosure.

Figure 1A:
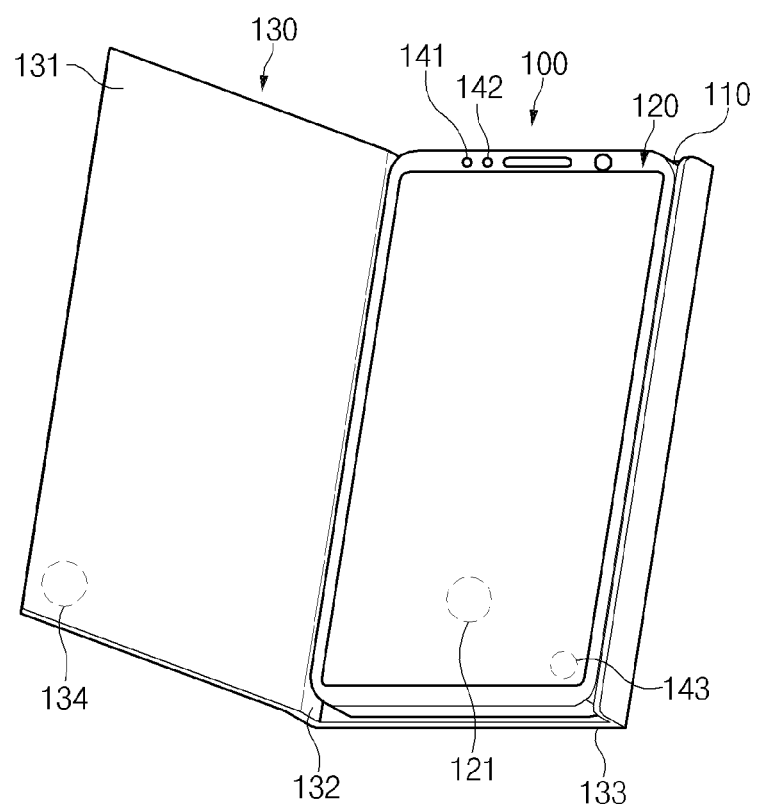
FIG. 1A is a view illustrating an example of operation of an electronic device according to an embodiment.
Figure 1B:
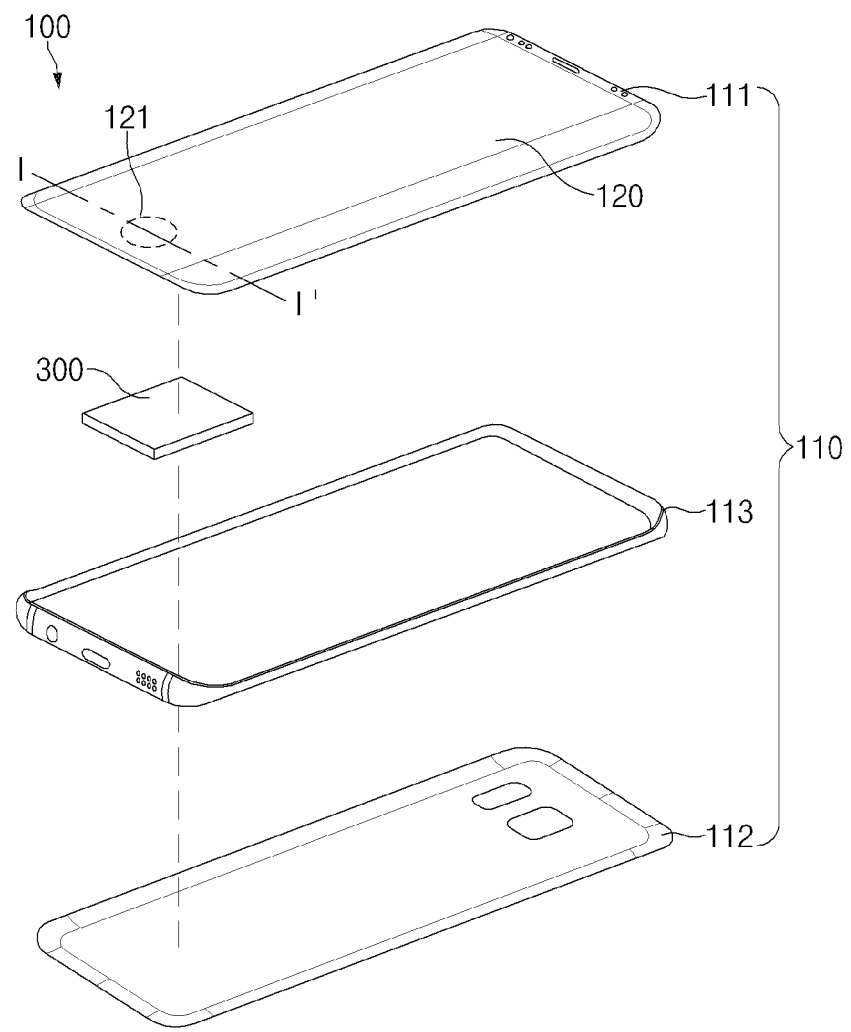
FIG. 1B is a view illustrating an arrangement of a fingerprint sensor according to an embodiment.
Figure 1C:
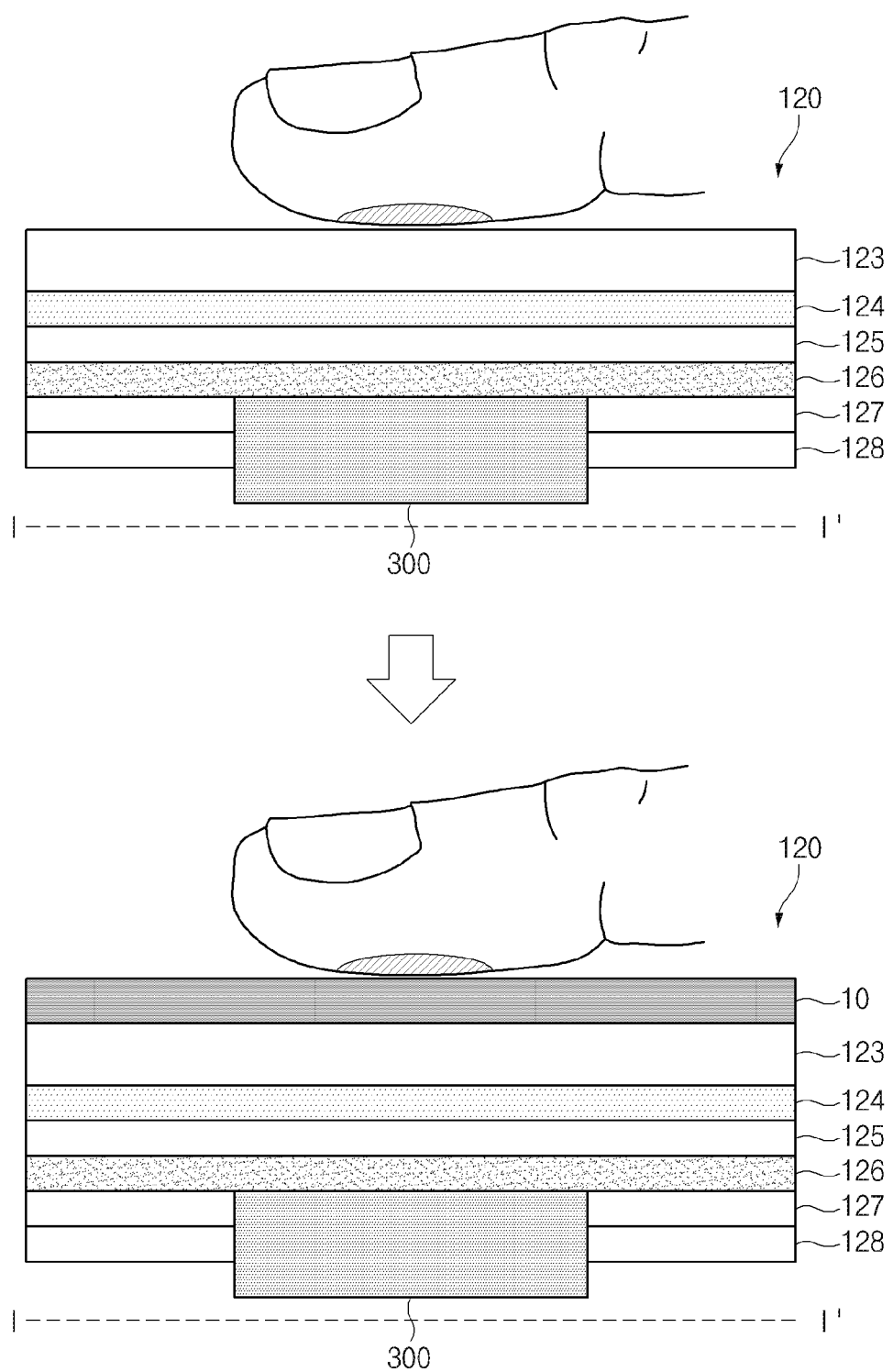
FIG. 1C illustrates a sectional view of a display according to an embodiment.

FIG. 1A is a view illustrating an example of operation of an electronic device according to an embodiment. FIG. 1B is a view illustrating an arrangement of a fingerprint sensor according to an embodiment. FIG. 1C illustrates a sectional view of a display according to an embodiment. FIG. 1C illustrates a sectional view taken along line I-I' of FIG. 1B.

Referring to FIGS. 1A and 1B, the electronic device 100 according to an embodiment may include a housing 110 that forms at least part of the exterior of the electronic device 100, the display 120 exposed to the outside through at least part of the housing 110, and a cover case 130 that shields at least part of the electronic device 100 from the outside.

According to an embodiment, the housing 110 may include a first plate 111 (e.g., a front plate) that faces a first direction, a second plate 112 (e.g., a rear plate) that faces a second direction opposite to the first direction, and a side member 113 that is disposed in at least part of the peripheral region between the first plate 111 and the second plate 112 (or, that surrounds the space between the first plate 111 and the second plate 112). For example, at least partial regions of the first plate 111, the second plate 112, and the side member 113 may be coupled together to form the housing 110 of the electronic device 100. In this regard, at least part of the periphery of the first plate 111 may be curved with a specified curvature and may extend in the second direction, and at least part of the periphery of the second plate 112 may be curved with a curvature that is the same as, or similar to, the specified curvature and may extend in the first direction. In various embodiments, the side member 113 may be integrated with the first plate 111 or the second plate 112 so as to be included as part of the first plate 111 or the second plate. In this case, the housing 110 of the electronic device 100 may be formed by coupling the first plate 111 and the second plate 112.

In an embodiment, at least one component associated with operating a function of the electronic device 100 may be received in the interior space of the housing 110 that is formed by the coupling of the first plate 111, the second plate 112, and the side member 113 (or, the coupling of the first plate 111 and the second plate 112). For example, the display 120 that outputs a screen may be received in the interior space of the housing 110, and at least part of the display 120 may be exposed to the outside through the first plate 111 of the housing 110. Furthermore, the fingerprint sensor 300 (e.g., an ultrasonic fingerprint sensor), which is disposed in a lower portion of the display 120, may be received in the interior space of the housing 110. In this regard, a fingerprint sensing region 121 may be included in the display 120 as a region corresponding to the arrangement of the fingerprint sensor 300, and the fingerprint sensing region 121 may be a region that is not visually exposed to a user or is minimally exposed to the user.

According to an embodiment, at least part of the electronic device 100 may be mounted on the cover case 130. For example, the electronic device 100 may be mounted on the cover case 130, based on a detachable coupling of the housing 110 and the cover case 130. Alternatively, part of the second plate 112 (e.g., the rear plate) of the housing 110 may be integrally formed with the cover case 130. In an embodiment, the cover case 130 may include a front part 131 that at least partially opens or closes over the first plate 111 (e.g., the front plate) of the housing 110 (or, the display 120), a side part 132 that extends from the front part 131 and at least partially opens or closes over the side member 113 of the housing 110, and a rear part 133 that extends from the side part 132 and at least partially covers the second plate 112 (e.g., the rear plate) of the housing 110. For example, the front part 131 (or, the front part 131 and the side part 132) may be rotated about the side part 132 within a specified angle range to allow at least part of the electronic device 100 to be open or closed to the outside. In this regard, a state in which the front part 131 (or, the front part 131 and the side part 132) is open with respect to the electronic device 100 may be defined as an open state of the cover case 130, and a state in which the front part 131 (or, the front part 131 and the side part 132) is closed with respect to the electronic device 100 may be defined as a closed state of the cover case 130. In various embodiments, the cover case 130 may include wireless communication circuitry in one region thereof and may perform short-range wireless communication with the electronic device 100. For example, the cover case 130 may transmit specified data (e.g., identification information (model information or ID information) of the cover case 130) to the electronic device 100 by performing the short-range wireless communication.

In an embodiment, the electronic device 100 may include at least one sensor associated with determining a state of the cover case 130. For example, the electronic device 100 may include at least one of an illuminance sensor 141, a proximity sensor 142, and a Hall sensor 143 that are received in the interior space of the housing 110, and at least one of the illuminance sensor 141, the proximity sensor 142, and the Hall sensor 143 may be exposed to the outside through the first plate 111 (e.g., the front plate) of the housing 110. The illuminance sensor 141 may sense, for example, the brightness for surroundings of the electronic device 100, based on the amount of light incident from the outside, and the electronic device 100 may determine a state of the cover case 130, based on the brightness sensed by the illuminance sensor 141. The proximity sensor 142 may sense, for example, an object that approaches, or is close to, the proximity sensor 142, through an internal structure of an inductive type, a capacitive type, an ultrasonic type, a photoelectric type, or a magnetic type, and the electronic device 100 may determine a state of the cover case 130, based on the presence or absence of the object sensed by the proximity sensor 142. The Hall sensor 143 may sense, for example, a voltage change depending on a magnetic field. In this regard, a magnetic material 134 may be included in one region of the front part 131 of the cover case 130 that is adjacent to the Hall sensor 143 in a closed state of the cover case 130, and the electronic device 100 may determine a state of the cover case 130, based on the voltage change sensed by the Hall sensor 143 in relation to the magnetic material 134.

Referring to FIG. 1C, the display 120 may include various layers. For example, the display 120, when viewed from above the first plate 111, may include a structure in which a transparent layer 123 (or, a glass panel), an adhesive layer 124, a polarization layer 125, a display panel 126, a protective layer 127, and a heat dissipation layer 128 are sequentially stacked one above another. In various embodiments, the display 120 may further include a touch panel integrated with the display 120 or operatively associated with the display 120.

The transparent layer 123 may be disposed at the top of the display 120 when viewed from above the first plate 111 and may protect the internal components of the display 120, or may transmit light generated by the display panel 126. The adhesive layer 124 may support adhesion between the transparent layer 123 and the polarization layer 125. The polarization layer 125 may retard the phase of light incident on the transparent layer 123, or may selectively transmit light oscillating with a specified phase axis. The display panel 126 may receive drive signals corresponding to contents information at a specified frame rate and may output a relevant screen based on the drive signals. The protective layer 127 may protect the rear surface of the display panel 126, and the heat dissipation layer 128 may conduct heat generated from the display panel 126 (or, the display 120) to the outside (or, another structure).

According to an embodiment, the fingerprint sensor 300 may be disposed in a portion from which some layers of the display 120 are removed. For example, the fingerprint sensor 300 may be disposed in a portion from which the protective layer 127 and/or the heat dissipation layer 128 is removed. According to an embodiment, the fingerprint sensor 300 may be disposed as a layer of the display 120. According to an embodiment, the fingerprint sensor 300 may be simply disposed on the rear surface of the heat dissipation layer 128. In an embodiment, the fingerprint sensor 300 may include an ultrasonic-wave transmitter and an ultrasonic-wave receiver, and at least one of the ultrasonic-wave transmitter and the ultrasonic-wave receiver may be disposed in a gap between patterns of light emitting elements included in the display panel 126. In an embodiment, the fingerprint sensor 300 may be operatively or physically coupled with the touch panel included in the display 120.

In an embodiment, the fingerprint sensor 300 may generate sound waves (e.g., ultrasonic waves) in a specified frequency band through the ultrasonic-wave transmitter and may collect reflected waves for the sound waves in the specified frequency band through the ultrasonic-wave receiver. In the case where the user's body (e.g., a finger) is brought into contact with the fingerprint sensing region 121 (refer to FIG. 1A or 1B), the reflected waves may include sound waves reflected by the user's body and may be referred to as fingerprint information of the user.

In various embodiments, a protective film 10 may be attached to the surface of the transparent layer 123 of the display 120. In this case, sound waves generated from the ultrasonic-wave transmitter of the fingerprint sensor 300 may be reflected by the user's body brought into contact with the fingerprint sensing region 121, or may be reflected by the protective film 10 and collected by the ultrasonic-wave receiver. In this regard, the fingerprint sensor 300 may calculate a retardation value between first reflected waves reflected by the user's body and second reflected waves reflected by the protective film 10 and may reflect the retardation value in the acquisition of the user fingerprint information, thereby improving the quality of the user fingerprint information.

In an embodiment, the electronic device 100 may generate a fingerprint image of the user, based on fingerprint information obtained through the fingerprint sensor 300 and may correct the generated fingerprint image to improve the reliability or quality of the fingerprint image. In this regard, the electronic device 100 may generate and store a background image (or, an air image) that is referred to as a reference image for the correction of the fingerprint image. For example, in the state in which any object is not brought into contact with the fingerprint sensing region 121 formed on the display 120, the electronic device 100 may control driving of the fingerprint sensor 300 to collect various pieces of background information and may generate the background image by collating the collected background information. The electronic device 100 may perform correction to remove noise from the fingerprint image by comparing the generated fingerprint image and the background image.

According to an embodiment, the electronic device 100 may periodically or aperiodically collect background information in regard to the generation of the background image or an update of the generated background image. For example, the electronic device 100 may collect the background information, based on detecting the occurrence of a specified event. In an embodiment, the specified event may include an event in which temperature measured by the electronic device 100 corresponds to temperature associated with a value that has reliability lower than reference reliability among a plurality of values associated with a plurality of temperatures previously registered for the correction. For example, assuming that the reliability of a second value associated with a second temperature previously registered is lower than the reliability of a first value associated with a first temperature previously registered and the reliability of a third value associated with a third temperature previously registered, the electronic device 100 may collect the background information, based on identifying that the reliability of the second value associated with the second temperature is low, in the case where the temperature measured by the electronic device 100 corresponds to the second temperature. In another embodiment, the specified event may include an event in which a specified period of time elapses from timing of directly previous correction. For example, the electronic device 100 may collect the background information, based on identifying that a specified period of time (e.g., three days) has elapsed after the performance of the directly previous correction.

According to an embodiment, the electronic device 100 may collect background information in a sleep state in view of an obstacle to the collection of the background information (e.g., heat generated from the electronic device 100 depending on operation of the electronic device 100 by the user, or contact of the user's body with the fingerprint sensing region 121). According to various embodiments, the cover case 130 may be in a closed state when the electronic device 100 is in the sleep state. In this case, the cover case 130 may act as an obstacle to the collection of the background information. For example, when the cover case 130 is in a closed state, the front part 131 of the cover case 130 may be brought into contact with at least part of the fingerprint sensing region 121, and therefore the electronic device 100 may not obtain valid background information. In this regard, the cover case 130 according to an embodiment may include a structure for avoiding contact with at least the fingerprint sensing region 121, and depending on the structure, an air gap may be formed between the front part 131 of the cover case 130 and the fingerprint sensing region 121 of the electronic device 100 when the cover case 130 is in the closed state.

Hereinafter, a structure of the cover case 130 that assists the electronic device 100 to obtain valid background information and an operation of obtaining background information by the electronic device 100 based on the structure of the cover case 130 will be described with reference to the accompanying drawings.

Figure 2A:
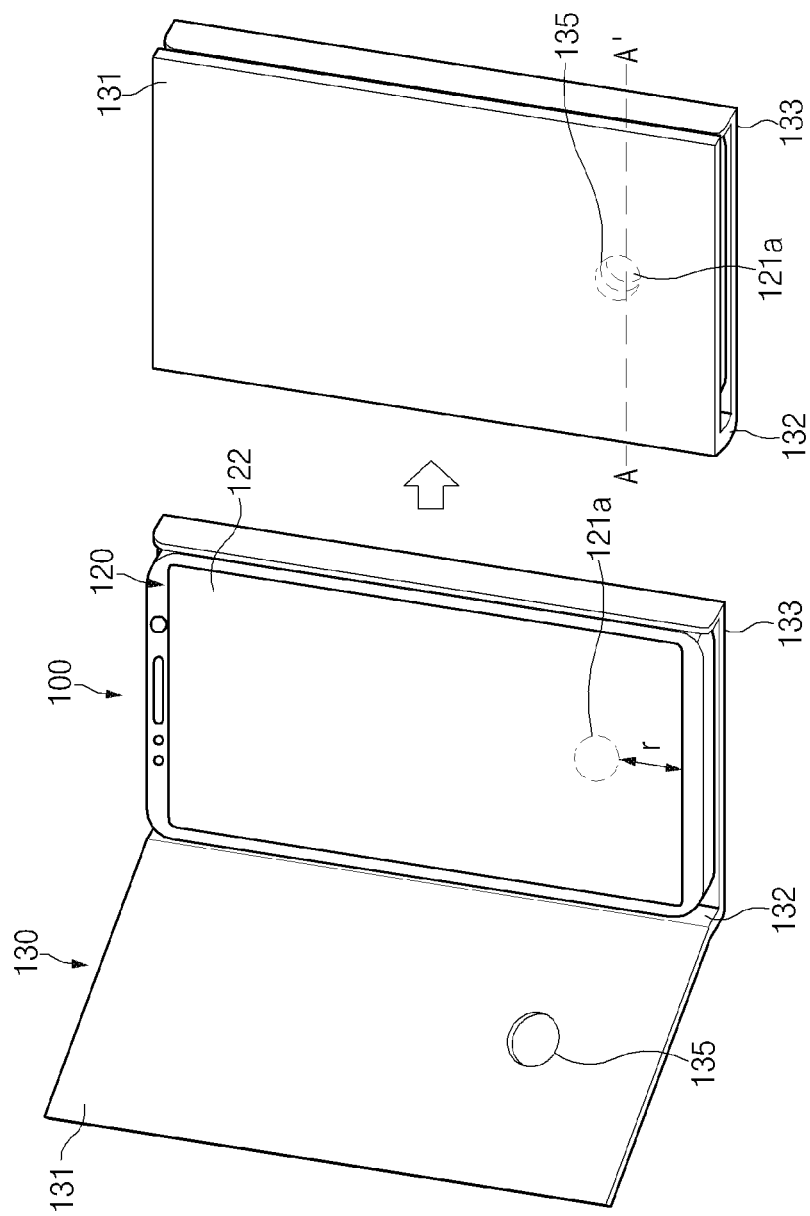
FIG. 2A is a view illustrating a cover case of the electronic device according to an embodiment.
Figure 2B:
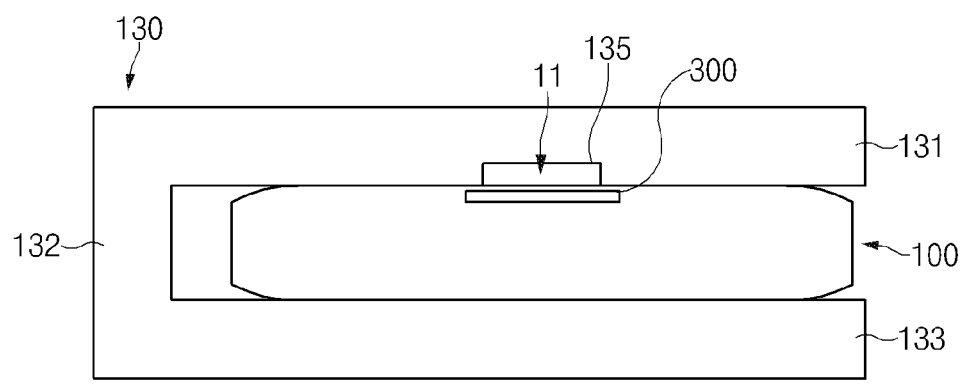
FIG. 2B illustrates a sectional view of the electronic device according to an embodiment.

FIG. 2A is a view illustrating a cover case of the electronic device according to an embodiment. FIG. 2B is a sectional view of the electronic device according to an embodiment. In FIGS. 2A and 2B, components corresponding to the above-described components may be denoted by the same reference numerals, and repetitive descriptions thereof may be omitted. Furthermore, FIG. 2B illustrates a sectional view taken along line A-A' of FIG. 2A.

Referring to FIGS. 2A and 2B, a fingerprint sensor (e.g., 300 of FIG. 1B or 1C) that is disposed in a lower portion of the display 120 of the electronic device 100 may be disposed in a specified position and size in a lower region of the display 120. For example, the fingerprint sensor may have a size ranging from 1% to 10% of the total area of a screen region 122 (or, an active region) of the display 120 and may be disposed in a position corresponding to a point spaced apart from the bottom of the screen region 122 toward the top thereof by a specified distance "r" (e.g., a distance within a range of 5 mm to 100 mm) with respect to the screen region 122 of the display 120. Accordingly, a fingerprint sensing region 121a having an area corresponding to the position and size of the fingerprint sensor may be included in one region of the display 120 that is located over the fingerprint sensor, and the area of the fingerprint sensing region 121a may range from 1% to 10% of the total area of the screen region 122. According to various embodiments, in the embodiment illustrated in FIGS. 2A and 2B or in the embodiments illustrated in the drawings that will be described below, the fingerprint sensor and the fingerprint sensing region 121a may have the same size, or one of the fingerprint sensor and the fingerprint sensing region 121a may have a larger size than the other. For example, the fingerprint sensor may have a larger size than the fingerprint sensing region 121a (or, the fingerprint sensing region 121a may have a smaller size than the fingerprint sensor).

In an embodiment, the cover case 130 of the electronic device 100 may include a structure for avoiding contact with the fingerprint sensing region 121a in a closed state (e.g., a state in which the front part 131 of the cover case 130 covers the display 120). For example, the cover case 130 may include an engraved region 135 as a region of the front part 131 that faces the fingerprint sensing region 121a when the front part 131 (or, the front part 131 and the side part 132) covers the electronic device 100. According to an embodiment, the engraved region 135 may be engraved on one region of the front part 131 to a specified depth and may have the same area as, or a larger area than, the fingerprint sensing region 121a having an area ranging from 1% to 10% of the total area of the screen region 122. Accordingly, when the cover case 130 is in the closed state, at least the fingerprint sensing region 121a may be superimposed on the engraved region 135 formed on the front part 131 of the cover case 130, and an air gap 11 (or, a void) based on the engraved region 135 may be formed between the front part 131 and the fingerprint sensing region 121a.

Figure 3A:
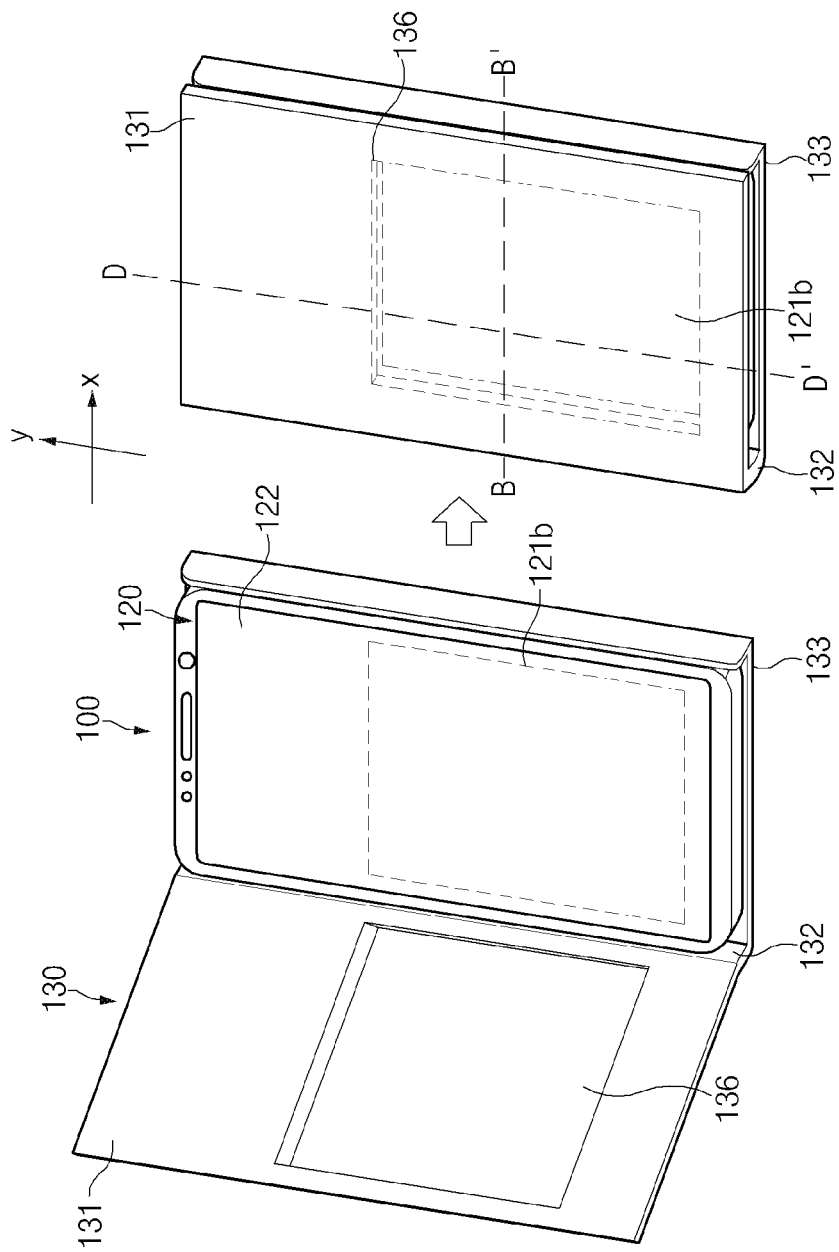
FIG. 3A is a view illustrating a cover case of the electronic device according to an embodiment.
Figure 3B:
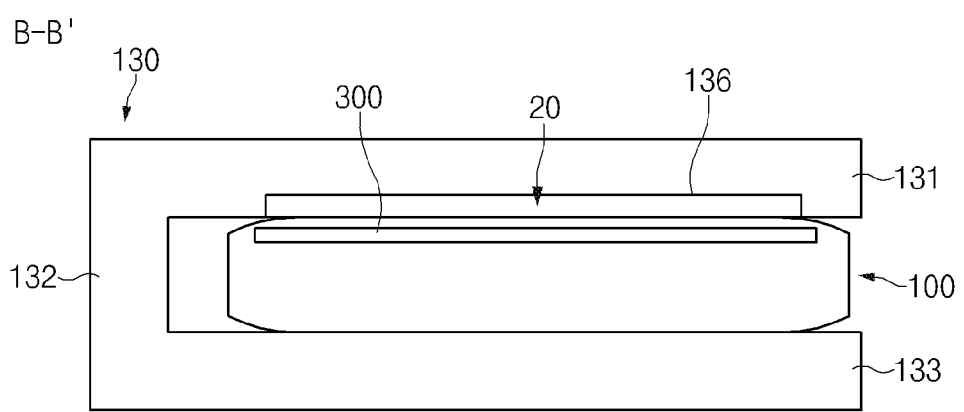
FIG. 3B illustrates sectional views of the electronic device according to an embodiment.
Figure 3B:
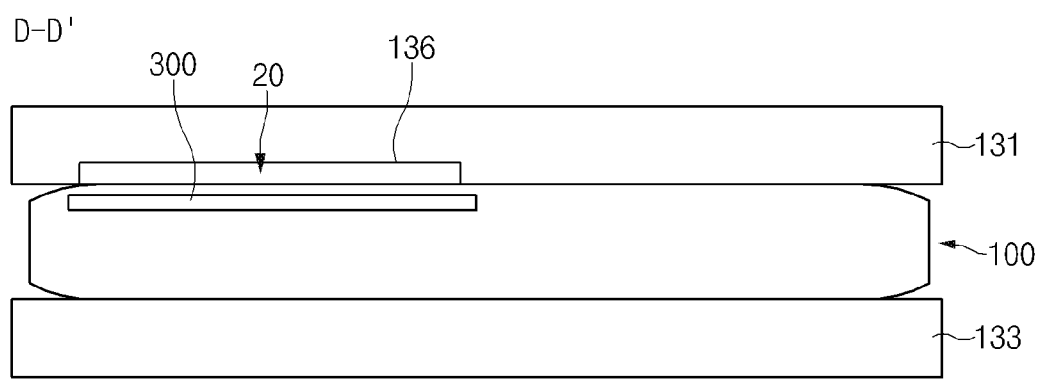

FIG. 3A is a view illustrating a cover case of the electronic device according to an embodiment. FIG. 3B illustrates sectional views of the electronic device according to an embodiment. In FIGS. 3A and 3B, components corresponding to the above-described components may be denoted by the same reference numerals, and repetitive descriptions thereof may be omitted. Furthermore, FIG. 3B illustrates sectional views taken along lines B-B' and D-D' of FIG. 3A.

Referring to FIGS. 3A and 3B, when the screen region 122 of the display 120 is divided at a specified ratio with respect to the direction of the X-axis illustrated, a fingerprint sensor (e.g., 300) of the electronic device 100 may be disposed in a lower region of the display 120 that corresponds to a screen region located on one side of the X-axis (e.g., on an upper side or a lower side of the X-axis). Furthermore, in the position corresponding to the screen region located on the one side of the X-axis, the fingerprint sensor may be disposed in a size ranging from 10% to 90% of the total area of the screen region 122 depending on the ratio. Accordingly, a fingerprint sensing region 121b having an area corresponding to the position and size of the fingerprint sensor may be included in one region of the display 120 that is located over the fingerprint sensor, and the area of the fingerprint sensing region 121b may range from 10% to 90%/o of the total area of the screen region 122.

According to an embodiment, to avoid contact with the fingerprint sensing region 121b in a closed state, the cover case 130 of the electronic device 100 may include an engraved region 136 as a region of the front part 131 that faces the fingerprint sensing region 121b when the front part 131 (or, the front part 131 and the side part 132) covers the electronic device 100. The engraved region 136 may be engraved on one region of the front part 131 to a specified depth and may have the same area as, or a larger area than, the fingerprint sensing region 121b having an area ranging from 10% to 90% of the total area of the screen region 122. Accordingly, when the cover case 130 is in the closed state, at least the fingerprint sensing region 121b may be superimposed on the engraved region 136 formed on the front part 131 of the cover case 130, and an air gap 20 based on the engraved region 136 may be formed between the front part 131 and the fingerprint sensing region 121.

Figure 4A:
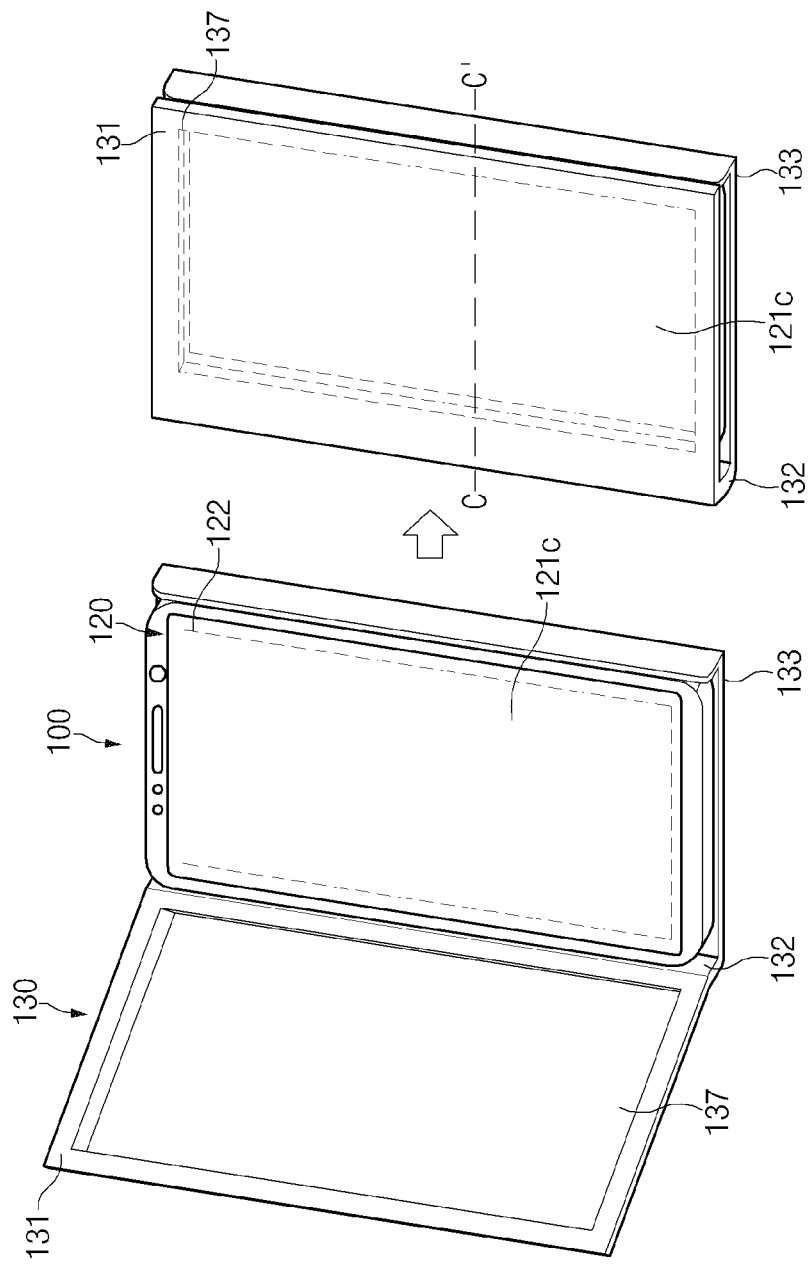
FIG. 4A is a view illustrating a cover case of the electronic device according to an embodiment.
Figure 4B:
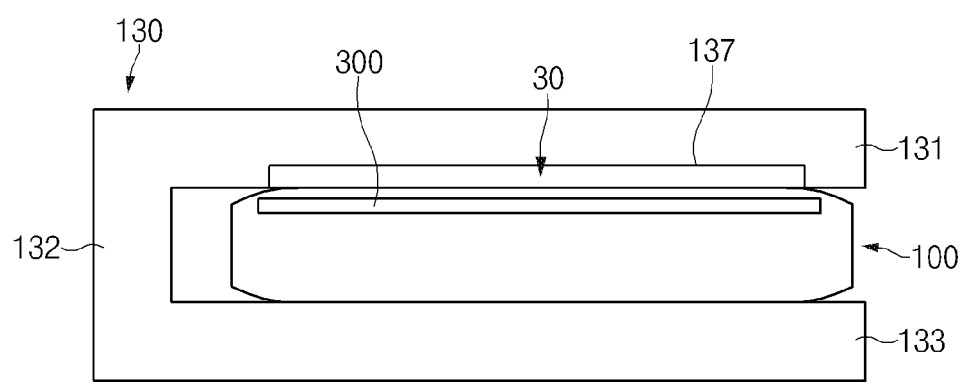
FIG. 4B illustrates a sectional view of the electronic device according to an embodiment.

FIG. 4A is a view illustrating a cover case of the electronic device according to an embodiment. FIG. 4B is a sectional view of the electronic device according to an embodiment. In FIGS. 4A and 4B, components corresponding to the above-described components may be denoted by the same reference numerals, and repetitive descriptions thereof may be omitted. Furthermore, FIG. 4B illustrates a sectional view taken along line C-C' of FIG. 4A.

Referring to FIGS. 4A and 4B, the fingerprint sensor 300 of the electronic device 100 may have a size substantially corresponding to the total area of the screen region 122 of the display 120 and may be disposed in a lower region of the display 120 that corresponds to the screen region 122. For example, in the lower region of the display 120, the fingerprint sensor 300 may be disposed parallel to the screen region 122 in a size ranging from 90% to 100% of the total area of the screen region 122. Accordingly, a fingerprint sensing region 121c having an area corresponding to the position and size of the fingerprint sensor 300 may be included in one region of the display 120 that is located over the fingerprint sensor 300, and the area of the fingerprint sensing region 121c may substantially range from 90% to 100% of the total area of the screen region 122.

In an embodiment, to avoid contact with the fingerprint sensing region 121c in a closed state, the cover case 130 of the electronic device 100 may include an engraved region 137 as a region of the front part 131 that faces the fingerprint sensing region 121c when the front part 131 (or, the front part 131 and the side part 132) covers the electronic device 100. According to an embodiment, the engraved region 137 may be engraved on the front part 131 to a specified depth so as to have the same area as the fingerprint sensing region 121c that has an area substantially corresponding to the total area of the screen region 122 (e.g., an area ranging from 90% to 100% of the total area of the screen region 122). Accordingly, when the cover case 130 is in the closed state, at least the fingerprint sensing region 121c may be superimposed on the engraved region 137 formed on the front part 131 of the cover case 130, and an air gap 30 based on the engraved region 137 may be formed between the front part 131 and the fingerprint sensing region 121c.

Figure 5:
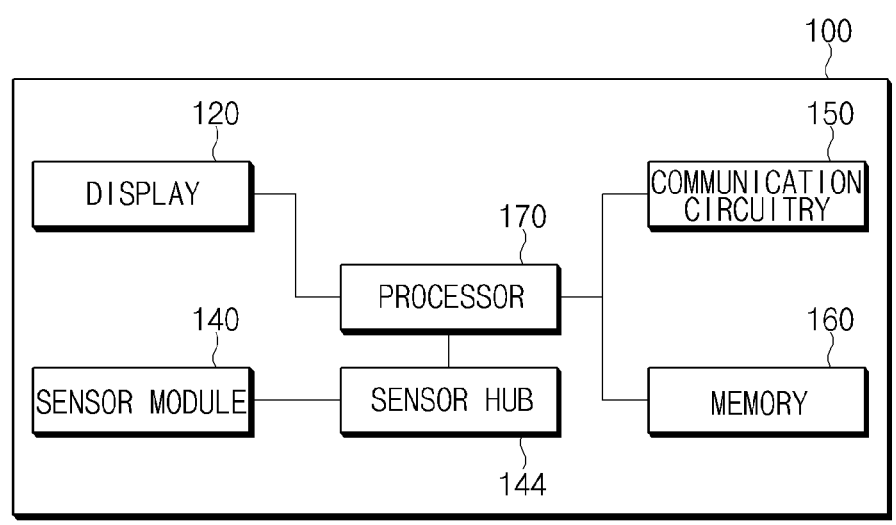
FIG. 5 is a view illustrating a configuration of the electronic device according to an embodiment.

FIG. 5 is a view illustrating a configuration of the electronic device according to an embodiment.

Referring to FIG. 5, the electronic device 100 may include the display 120, a sensor module 140, a sensor hub 144, communication circuitry 150, a memory 160, and a processor 170. In various embodiments, the electronic device 100 may not include at least one of the aforementioned components, or may further include other component(s). For example, the electronic device 100 may further include components of an electronic device 701 that will be described below with reference to FIG. 7.

The display 120 may receive image driving signals corresponding to image information at a specified frame rate and may output various types of contents by processing the image driving signals. For example, when a user fingerprint authentication event occurs on the electronic device 100, the display 120 may output an image (e.g., an image in a fingerprint shape) for guiding contact of a user's body with a fingerprint sensing region (e.g., 121a of FIG. 2A) that is associated with obtaining user fingerprint information. Alternatively, the display 120 may output a guide line for specifying a fingerprint sensing region (e.g., 121b of FIG. 3A or 121c of FIG. 4A) on the periphery of the fingerprint sensing region 121b or 121c. In an embodiment, the display 120 may be implemented with a touch screen display including a touch panel. The touch panel may output an electrical signal by detecting a user input occurring on the touch screen display and may transfer information regarding the electrical signal to the processor 170.

The sensor module 140 may sense at least one piece of information regarding an operating environment of the electronic device 100 and may generate signals or data. According to an embodiment, the sensor module 140 may include the illuminance sensor 141 (refer to FIG. 1), the proximity sensor 142 (refer to FIG. 1), the Hall sensor 143 (refer to FIG. 1), and the fingerprint sensor 300 (refer to FIG. 1B, 1C, 2B, 3B, or 4B), which are described above, and the sensor hub 144 (or, the sub-processor). In an embodiment, the fingerprint sensor 300 may generate sound waves, at least a part of which is directed toward the fingerprint sensing region 121a, 121b, or 121c, in a specific frequency band based on physical displacement (e.g., vibration) and may receive response signals of the sound waves to obtain fingerprint information of the user's body (e.g., a finger) that is brought into contact with the fingerprint sensing region 121a, 121b, or 121c. Alternatively, in the state in which any object is not brought into contact with the fingerprint sensing region 121a, 121b, or 121c, the fingerprint sensor 300 may generate sound waves, at least a part of which is directed toward the fingerprint sensing region 121a, 121b, or 121c, in the specific frequency band and may receive response signals of the sound waves to obtain background information. According to an embodiment, the operation of obtaining, by the fingerprint sensor 300, the background information may be performed in a sleep state of the processor 170 (e.g., the main processor). For example, the sensor hub 144 (or, the sub-processor) may operate in an active state to control driving of the fingerprint sensor 300 to obtain the background information in the sleep state of the processor 170. Alternatively, the sensor hub 144 in an active state may activate the processor 170 in a sleep state, and the operation of obtaining, by the fingerprint sensor 300, the background information may be performed under the control of the activated processor 170. In this regard, the sensor hub 144 may activate the processor 170 in the sleep state according to a specified period (e.g., one week or one month), or the sensor hub 144 may aperiodically activate the processor 170 when a temperature change of the electronic device 100, the fingerprint sensor 300, or the fingerprint sensing region 121a, 121b, or 121c that is greater than or equal to a specified threshold value is detected.

The communication circuitry 150 may support communication between the electronic device 100 and at least one external device. For example, the communication circuitry 150 may establish wired communication or wireless communication with the at least one external device according to a specified protocol and may transmit and receive data and signals via the wired communication or the wireless communication. According to an embodiment, the wireless communication may include short-range wireless communication, and the communication circuitry 150 may receive specified data (e.g., identification information (model information or ID information) of the cover case 130) from the cover case 130 (refer to FIG. 1A, 2A, 2B, 3A, 3B, 4A, or 4B), on which the electronic device 100 is mounted, via the short-range wireless communication.

The memory 160 may store at least one signal or at least one piece of data related to operation of the electronic device 100, or may store at least one instruction related to functional operations of the components in the electronic device 100. For example, the memory 160 may store user fingerprint information or background information that is obtained through the fingerprint sensor 300. In another example, the memory 160 may store a user fingerprint template that is referred to for authentication of a fingerprint image generated based on the user fingerprint information. In another example, the memory 160 may store a background image that is generated based on the background information and is referred to for correction of the fingerprint image.

The processor 170 may be implemented with at least one of a central processing unit, an application processor, or a communication processor and may control the above-described components of the electronic device 100. For example, the processor 170 may be electrically or operatively connected with the components of the electronic device 100 and may transfer at least one command related to a functional operation to the components or may perform various data processing or computation.

In an embodiment, the processor 170 may be periodically or aperiodically changed from a sleep state to an active state by the sensor hub 144 (or, the sub-processor) and may perform a series of processes for obtaining background information in the active state. For example, when receiving specified data (e.g., identification information (model information or ID information) of the cover case 130) from the cover case 130 via short-range wireless communication of the communication circuitry 150, the processor 170 may determine the cover case 130 to be the cover case 130 including the engraved region 135, 136, or 137 (refer to FIGS. 2A and 2B, 3A and 3B, or 4A and 4B). In this case, the processor 170 may determine the time to obtain background information through the fingerprint sensor 300 to be the time when the cover case 130 is in a closed state, and may determine a state of the cover case 130, based on information sensed by at least one of the illuminance sensor 141, the proximity sensor 142, and the Hall sensor 143. In an embodiment, the processor 170 may control the fingerprint sensor 300 to obtain background information, when it is determined that the cover case 130 covers the electronic device 100. The operation of the processor 170 may be understood as an operation considering that when the electronic device 100 is in an active state, a probability that the cover case 130 is in an open state is higher than a probability that the cover case 130 is in a closed state, and valid background information may not be obtained through the fingerprint sensing region 121a, 121b, or 121c depending on the active state of the electronic device 100 or the open state of the cover case 130.

In an embodiment, when failing to receive the specified data (e.g., identification information (model information or ID information) of the cover case 130) from the cover case 130, the processor 170 may determine the cover case 130 to be the cover case 130 not including the engraved region 135, 136, or 137. In this case, the processor 170 may determine the time to obtain background information through the fingerprint sensor 300 to be the time when the cover case 130 is changed from a closed state to an open state. The processor 170 may determine a state of the cover case 130 based on at least one of the illuminance sensor 141, the proximity sensor 142, and the Hall sensor 143, may exclude acquisition of background information through the fingerprint sensor 300 when the cover case 130 is in a closed state, and may control the fingerprint sensor 300 to obtain background information at the time when the cover case 130 is changed from the closed state to an open state. The operation of the processor 170 may be understood as an operation considering that when the cover case 130 not including the engraved region 135, 136, or 137 is in the closed state, the cover case 130 is brought into contact with the fingerprint sensing region 121a, 121b, or 121c, and therefore valid background information may not be obtained through the fingerprint sensing region 121a, 121b, or 121c. Alternatively, the operation of the processor 170 may be understood as an operation considering that a probability that any object is brought into contact with the fingerprint sensing region 121a, 121b, or 121c is low at the time when the cover case 130 is changed from the closed state to the open state.

Figure 6A:
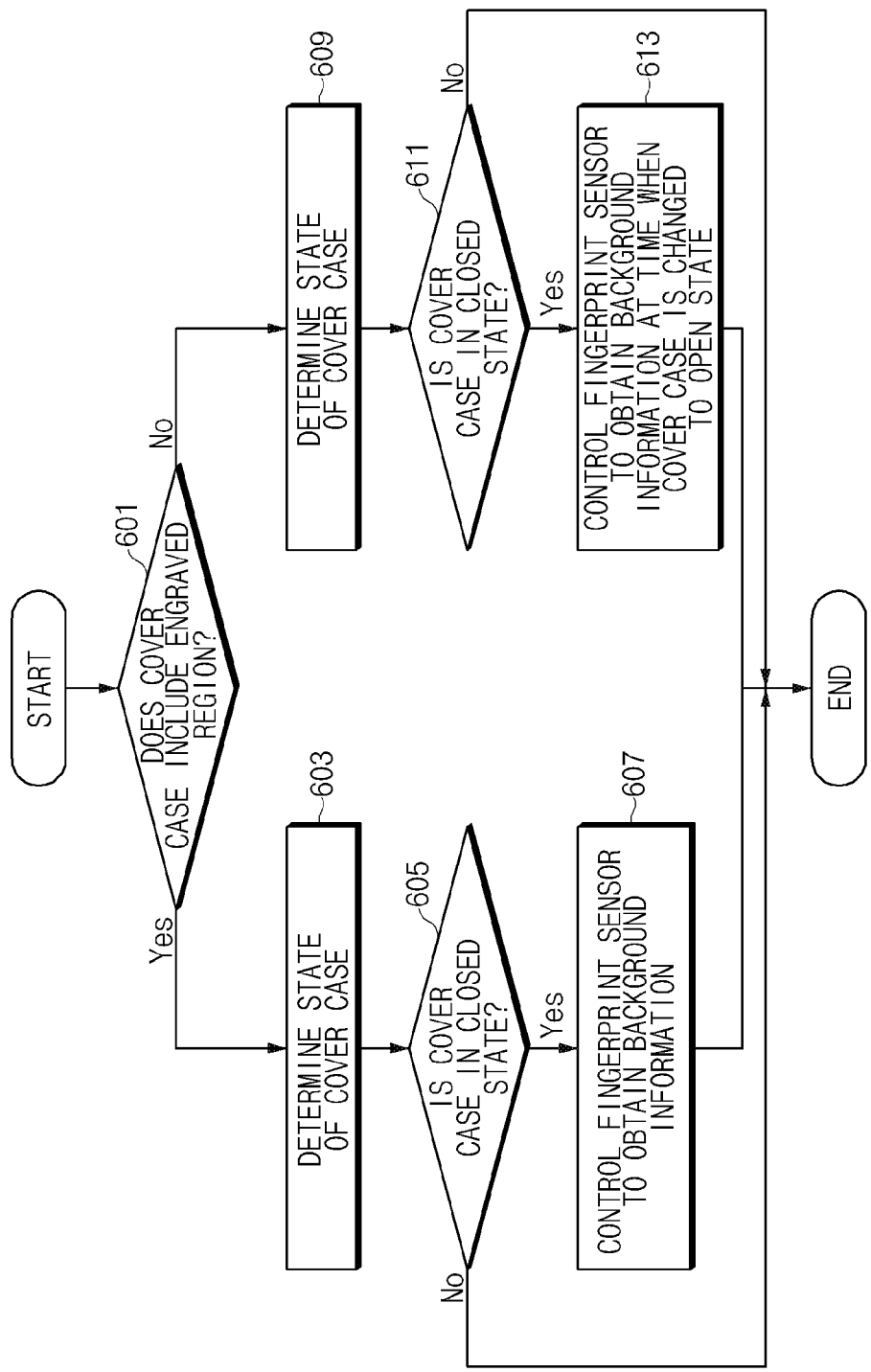
FIG. 6A is a view illustrating operations of the electronic device relevant to a method for obtaining background information according to an embodiment.

FIG. 6A is a view illustrating operations of the electronic device relevant to a method for obtaining background information according to an embodiment. The operations that will be described below may be understood as, for example, operations performed by the processor of the electronic device that is changed from a sleep state to an active state.

Referring to FIG. 6A, in operation 601, the processor 170 (refer to FIG. 5) of the electronic device 100 (refer to FIG. 1A, 1B, 2A, 2B, 3A, 3B, 4A, 4B, or 5) may determine whether the cover case 130 (refer to FIG. 1A, 2A, 2B, 3A, 3B, 4A, or 4B), on which the electronic device 100 is mounted, includes the engraved region 135, 136, or 137 (refer to FIGS. 2A and 2B, 3A and 3B, or 4A and 4B). For example, to determine whether the engraved region 135, 136, or 137 is included in the cover case 130, the processor 170 may determine whether specified data (e.g., identification information (model information or ID information) of the cover case 130) is received from the cover case 130 via short-range wireless communication of the communication circuitry 150 (refer to FIG. 5). According to various embodiments, determining whether the cover case 130 includes the engraved region 135, 136, or 137 may be understood as determining whether the cover case 130 makes contact with the fingerprint sensing region 121a, 121b, or 121c (refer to FIG. 2A, 3A, or 4A) in a closed state of the cover case 130.

When it is determined in operation 601 that the specified data is received from the cover case 130, the processor 170 may, in operation 603, determine the cover case 130 to be the cover case 130 including the engraved region 135, 136, or 137 (or, may determine the cover case 130 to be the cover case 130 that is not brought into contact with the fingerprint sensing region 121a, 121b, or 121c in the closed state), and may determine a state of the cover case 130 for the electronic device 100. For example, when the brightness value sensed by the illuminance sensor 141 (refer to FIG. 1A) is higher than or equal to a specified threshold value, the processor 170 may determine that the cover case 130 is in an open state, and when the brightness value is lower than the specified threshold value, the processor 170 may determine that the cover case 130 is in a closed state. Alternatively, when no object is sensed by the proximity sensor 142 (refer to FIG. 1A) or an object beyond a specified distance range with respect to the proximity sensor 142 is sensed, the processor 170 may determine that the cover case 130 is in an open state, and when an object within the specified distance range is sensed, the processor 170 may determine that the cover case 130 is in a closed state. In another case, when a voltage change depending on a magnetic field is not sensed by the Hall sensor 143 (refer to FIG. 1A), the processor 170 may determine that the cover case 130 is in an open state, and when the voltage change depending on the magnetic field is sensed, the processor 170 may determine that the cover case 130 is in a closed state.

In operation 605 and operation 607, when it is determined that the cover case 130 including the engraved region 135, 136, or 137 is in a closed state, the processor 170 may obtain background information by controlling the fingerprint sensor 300 (refer to FIG. 1B, 1C, 2B, 3B, or 4B) that is disposed in a lower portion of the display 120 (refer to FIG. 1A, 1B, 1C, 2A, 3A, 4A, or 5). For example, the processor 170 may apply voltage to the fingerprint sensor 300 to allow the fingerprint sensor 300 to generate sound waves in a specific frequency band based on physical displacement (e.g., vibration) and may obtain the background information by scanning voltage generated depending on receipt of response signals of the sound waves. According to various embodiments, in the operation of obtaining the background information, the processor 170 may stop obtaining the background information through the fingerprint sensor 300 when a touch sensor or a pressure sensor included in the display 120 senses any object (e.g., a user's body or foreign matter) that is brought into contact with the display 120.

According to various embodiments, operation 607 of obtaining the background information may be performed based on detection of a specified event. For example, the processor 170 may obtain the background information when background information corresponding to the current temperature among various pieces of background information collected on the electronic device 100 (or, the memory 160 (refer to FIG. 5)) in relation to user fingerprint image correction is absent or insufficient, or when it is identified that a specified period of time has elapsed after the collection of the background information corresponding to the current temperature. In an embodiment, the processor 170 may obtain the background information when a sudden change in temperature is sensed in the closed state of the cover case 130. In an embodiment, the processor 170 may obtain the background information when identifying the arrival of a specified period relevant to acquisition of background information. In an embodiment, the processor 170 may manage the background information obtained in the state in which the cover case 130 including the engraved region 135, 136, or 137 is closed, with reference reliability higher than those of other pieces of background information. For example, the electronic device 100 may manage the background information obtained in the state in which the cover case 130 is closed, with reference reliability higher than the reference reliability of background information obtained when the electronic device 100 is not mounted on the cover case 130, or the reference reliability of background information obtained when the electronic device 100 is mounted on the cover case 130 not including the engraved region 135, 136, or 137.

According to an embodiment, the operation of detecting whether the specified event for obtaining the background information occurs may be performed before operation 601 or operation 603. For example, when the specified event for obtaining the background information occurs, the electronic device 100 may perform the operation of determining whether the cover case 130 includes the engraved region and/or the operation of determining the state of the cover case 130 and thereafter may control the fingerprint sensor 300 to obtain the background information.

When it is determined in operation 601 that the specified data is not received from the cover case 130, the processor 170 may, in operation 609, determine the cover case 130 to be the cover case 130 not including the engraved region 135, 136, or 137 (or, may determine the cover case 130 to be the cover case 130 that is brought into contact with the fingerprint sensing region 121a, 121b, or 121c in the closed state), and may determine a state of the cover case 130 in a manner similar to that described above with reference to FIG. 6A.

In operation 611 and operation 613, when it is determined that the cover case 130 not including the engraved region 135, 136, or 137 is in a closed state, the processor 170 may obtain background information by consistently monitoring a change of state of the cover case 130 and controlling the fingerprint sensor 300 at the time when the cover case 130 is changed from the closed state to an open state. According to various embodiments, in the operation of obtaining the background information, the processor 170 may stop obtaining the background information through the fingerprint sensor 300 when the touch sensor or the pressure sensor included in the display 120 senses any object (e.g., the user's body or foreign matter) that is brought into contact with the display 120. At this time, the processor 170 may detect the contact of any object with the display 120 according to a higher criterion or recognition rate because the cover case 130 is in the open state. According to an embodiment, in the operation of obtaining the background information, when the cover case 130 in the open state is changed to a closed state, the processor 170 may stop obtaining the background information in view of the contact between the cover case 130 in the closed state and the fingerprint sensing region 121a, 121b, or 121c. Alternatively, the processor 170 may stop obtaining the background information through the fingerprint sensor 300 when a sudden change in temperature is sensed during the acquisition of the background information.

Figure 6B:
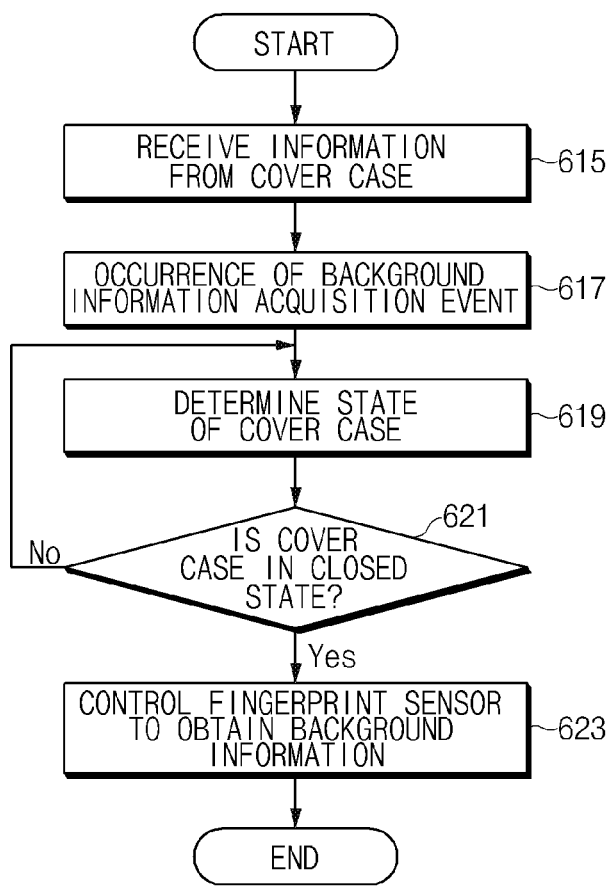
FIG. 6B is a view illustrating operations of the electronic device relevant to a method for obtaining background information according to an embodiment.

FIG. 6B is a view illustrating operations of the electronic device relevant to a method for obtaining background information according to an embodiment. The operations that will be described below may be understood as, for example, operations performed by the processor of the electronic device that is changed from a sleep state to an active state.

Referring to FIG. 6B, in operation 615, the processor 170 (refer to FIG. 5) of the electronic device 100 (refer to FIG. 1A, 1B, 2A, 2B, 3A, 3B, 4A, 4B, or 5) may receive specified information from the cover case 130 (refer to FIG. 1A, 2A, 2B, 3A, 3B, 4A, or 4B) on which the electronic device 100 is mounted. For example, the processor 170 may receive identification information (e.g., model information or ID information) of the cover case 130 from the cover case 130 via short-range wireless communication. In an embodiment, when receiving the identification information from the cover case 130, the processor 170 may determine the corresponding cover case 130 to be the cover case 130 including the engraved region 135, 136, or 137 (refer to FIGS. 2A and 2B, 3A and 3B, or 4A and 4B). Alternatively, the processor 170 may receive information representing that the cover case 130 includes the engraved region 137, from the cover case 130 via short-range wireless communication.

In operation 617, the processor 170 may detect occurrence of a specified background information acquisition event. For example, when detecting that a specified period of time has elapsed from the time when previous correction was performed on background information, the processor 170 may determine to obtain background information at the current time. In another example, when background information corresponding to the temperature measured by the electronic device 100 at present among various pieces of background information collected on the electronic device 100 is absent or insufficient, the processor 170 may determine to obtain background information at the current temperature. In another example, when it is identified that a specified period of time has elapsed after the collection of background information that corresponds to the currently measured temperature among various pieces of background information collected on the electronic device 100, the processor 170 may determine to obtain background information at the current temperature. In another example, when a change in the current temperature measured by the electronic device 100 is beyond a specified threshold range, the processor 170 may determine to obtain background information at the current temperature.

In operation 619, the processor 170 may determine a state of the cover case 130 according to the detection of the specified background information acquisition event. For example, when the brightness value sensed by the illuminance sensor 141 (refer to FIG. 1A) is higher than or equal to a specified threshold value, the processor 170 may determine that the cover case 130 is in an open state, and when the brightness value is lower than the specified threshold value, the processor 170 may determine that the cover case 130 is in a closed state. Alternatively, when no object is sensed by the proximity sensor 142 (refer to FIG. 1A) or an object beyond a specified distance range with respect to the proximity sensor 142 is sensed, the processor 170 may determine that the cover case 130 is in an open state, and when an object within the specified distance range is sensed, the processor 170 may determine that the cover case 130 is in a closed state. In another case, when a voltage change depending on a magnetic field is not sensed by the Hall sensor 143 (refer to FIG. 1A), the processor 170 may determine that the cover case 130 is in an open state, and when the voltage change depending on the magnetic field is sensed, the processor 170 may determine that the cover case 130 is in a closed state.

According to various embodiments, the determination of the state of the cover case 130 by the processor 170 may be based on an operation of determining acquisition time of background information to be the time when the cover case 130 is in a closed state, depending on the receipt of specified information (e.g., identification information or information including an engraved region) from the cover case 130. The operation of the processor 170 may be an operation considering that when the electronic device 100 is in an active state, a probability that the cover case 130 is in an open state is higher than a probability that the cover case 130 is in a closed state and when the cover case 130 is in an open state, valid background information may not be obtained due to contact of the user's body with the fingerprint sensing region 121*a*, 121*b*, or 121*c* (refer to FIG. 2A, 3A, or 4A) or a possibility of a presence of foreign matter on the fingerprint sensing region 121*a*, 121*b*, or 121*c*.

When it is determined in operation 621 that the cover case 130 is in a closed state, the processor 170 may, in operation 623, obtain background information by controlling the fingerprint sensor 300 (refer to FIG. 1B, 1C, 2B, 3B, or 4B) that is disposed in a lower portion of the display 120 (refer to FIG. 1A, 1B, 1C, 2A, 3A, 4A, or 5). In this operation, the processor 170 may stop obtaining the background information when the touch sensor or the pressure sensor included in the display 120 senses any object (e.g., the user's body or foreign matter) that is brought into contact with the display 120. Alternatively, the processor 170 may determine a state of the cover case 130 in real time in the operation of obtaining the background information and may stop obtaining the background information when the cover case 130 is changed from a closed state to an open state. According to an embodiment, the processor 170 may manage the background information obtained in the state in which the cover case 130 including the engraved region 135, 136, or 137 is closed, with reference reliability higher than those of other pieces of background information. For example, the electronic device 100 may manage the background information obtained in the state in which the cover case 130 is closed, with reference reliability higher than the reference reliability of background information obtained when the electronic device 100 is not mounted on the cover case 130, or the reference reliability of background information obtained when the electronic device 100 is mounted on the cover case 130 not including the engraved region 135, 136, or 137.

When it is determined in operation 621 that the cover case 130 is in an open state, the processor 170 may determine a state of the cover case 130 every specified period. For example, when the cover case 130 is changed from an open state to a closed state, the processor 170 may monitor a state of the cover case 130 so as to obtain background information. In this operation, the processor 170 may stop determining a state of the cover case 130 when a condition associated with obtaining the background information is released (e.g., when the current temperature change is within a specified threshold range).

An electronic device according to various embodiments may include a housing including a first plate that faces a first direction, a second plate that faces a second direction opposite to the first direction, and a side member disposed in at least part of a peripheral region between the first plate and the second plate, a touch screen display, at least part of which is exposed through the first plate of the housing, a fingerprint sensor disposed in a lower portion of the touch screen display, and a cover case that is coupled or integrated with at least part of the housing and that opens or closes the first plate of the housing.

According to various embodiments, an air gap may be formed between a first region of the touch screen display that corresponds to the fingerprint sensor and a second region of the cover case that faces at least the first region, with the cover case closing the first plate of the housing.

According to various embodiments, the second region of the cover case may include an engraved region having the same area as the first region of the touch screen display.

According to various embodiments, the first region of the touch screen display may be located in a position spaced apart from the bottom of a screen region included in the touch screen display toward the top of the screen region by a specified distance and may have an area ranging from 1% to 10% of the total area of the screen region.

According to various embodiments, when a screen region included in the touch screen display is divided at a specified ratio with respect to a specified direction, the first region of the touch screen display may have, in a partial screen region by the division, an area ranging from 10% to 90% of the total area of the screen region.

According to various embodiments, the first region of the touch screen display may have an area ranging from 90% to 100% of the total area of a screen region included in the touch screen display.

An electronic device according to various embodiments may include a housing including a first plate that faces a first direction, a second plate that faces a second direction opposite to the first direction, and a side member disposed in at least part of a peripheral region between the first plate and the second plate, a touch screen display, at least part of which is exposed through the first plate of the housing, a fingerprint sensor that is disposed in a lower portion of the touch screen display and that obtains fingerprint information, a cover case that is coupled or integrated with at least part of the housing and that opens or closes the first plate of the housing, a sensor module, communication circuitry, and a processor electrically connected with the touch screen display, the fingerprint sensor, the sensor module, and the communication circuitry.

According to various embodiments, the processor may determine whether specified data is received from the cover case via the communication circuitry, may determine whether the cover case makes contact with one region of the touch screen display that corresponds to the fingerprint sensor, in a state in which the cover case closes the first plate of the housing, based on the determination as to whether the specified data is received, may determine whether the cover case is in an open state or a closed state, based on information sensed through the sensor module, and may decide the time to obtain specified information using the fingerprint sensor, based on the determination as to whether the cover case makes contact with the one region of the touch screen display and the determination as to whether the cover case is in the open state or the closed state.

According to various embodiments, the specified information may include background information obtained based on transmission of sound waves in a specified frequency band and receipt of response signals of the sound waves by the fingerprint sensor, in a state in which any object is not brought into contact with the one region of the touch screen display.

According to various embodiments, the processor may determine that the cover case is not brought into contact with the one region of the touch screen display in a closed state, in a case where the processor receives the specified data from the cover case.

According to various embodiments, the processor may decide the time to obtain the specified information to be the time when the cover case is in a closed state, in the case where the processor receives the specified data from the cover case.

According to various embodiments, the processor may determine that the cover case is brought into contact with the one region of the touch screen display in a closed state, in a case where the processor does not receive the specified data from the cover case.

According to various embodiments, the processor may decide the time to obtain the specified information to be the time when the cover case is changed from a closed state to an open state, in the case where the processor does not receive the specified data from the cover case.

According to various embodiments, the processor may obtain the specified information by controlling driving of the fingerprint sensor at the decided time to obtain the specified information and may generate or update a background image using the specified information obtained.

According to various embodiments, the processor may generate a fingerprint image using the fingerprint sensor and may remove noise from the fingerprint image by comparing the fingerprint image and the background image.

According to various embodiments, the processor may determine, through the sensor module, whether a temperature change greater than or equal to a specified threshold value is detected or whether a specified time period arrives and may decide the time to obtain the specified information using the fingerprint sensor, based on an outcome of the determination.

A method for obtaining background information by an electronic device according to various embodiments may include determining whether specified data is received from a cover case via communication circuitry, the cover case being coupled or integrated with at least part of a housing of the electronic device, determining whether the cover case makes contact with one region of a touch screen display in a state in which the cover case closes a plate included in the housing, based on the determination as to whether the specified data is received, determining whether the cover case is in an open state or a closed state, based on information sensed through a sensor module, and deciding the time to obtain specified information using a fingerprint sensor, based on the determination as to whether the cover case makes contact with the one region of the touch screen display and the determination as to whether the cover case is in the open state or the closed state, wherein the fingerprint sensor is disposed in a lower region of the touch screen display that corresponds to the one region of the touch screen display.

According to various embodiments, the method may further include obtaining background information as at least part of the specified information by transmitting sound waves in a specified frequency band and receiving response signals of the sound waves by the fingerprint sensor, in a state in which any object is not brought into contact with the one region of the touch screen display.

According to various embodiments, the determining of whether the cover case makes contact with the one region of the touch screen display may include determining that the cover case is not brought into contact with the one region of the touch screen display in a closed state, in a case where the specified data is received from the cover case and determining that the cover case is brought into contact with the one region of the touch screen display in a closed state, in a case where the specified data is not received from the cover case.

According to various embodiments, the deciding of the time to obtain the specified information may include deciding the time to obtain the specified information to be the time when the cover case is in a closed state, when it is determined that the cover case is not brought into contact with the one region of the touch screen display in the closed state and deciding the time to obtain the specified information to be the time when the cover case is changed from a closed state to an open state, when it is determined that the cover case is brought into contact with the one region of the touch screen display in the closed state.

According to various embodiments, the determining of whether the cover case is in the open state or the closed state may include determining that the cover case is in the open state, when a brightness value sensed by an illuminance sensor is higher than or equal to a specified threshold value and determining that the cover case is in the closed state, when the brightness value sensed by the illuminance sensor is lower than the specified threshold value.

According to various embodiments, the determining of whether the cover case is in the open state or the closed state may include determining that the cover case is in the open state, when no object is sensed by a proximity sensor or when an object beyond a specified distance range with respect to the proximity sensor is detected and determining that the cover case is in the closed state, when an object within the specified distance range from the proximity sensor is detected.

According to various embodiments, the determining of whether the cover case is in the open state or the closed state may include determining that the cover case is in the open state, when a voltage change depending on a magnetic field is not sensed by a Hall sensor and determining that the cover case is in the closed state, when the voltage change depending on the magnetic field is sensed by the Hall sensor.

According to various embodiments, the method may further include obtaining the specified information, based at least partly on determining the time to obtain the specified information.

According to various embodiments, the obtaining of the specified information may include stopping obtaining the specified information, when contact of an object with the one region of the touch screen display is detected.

Figure 7:
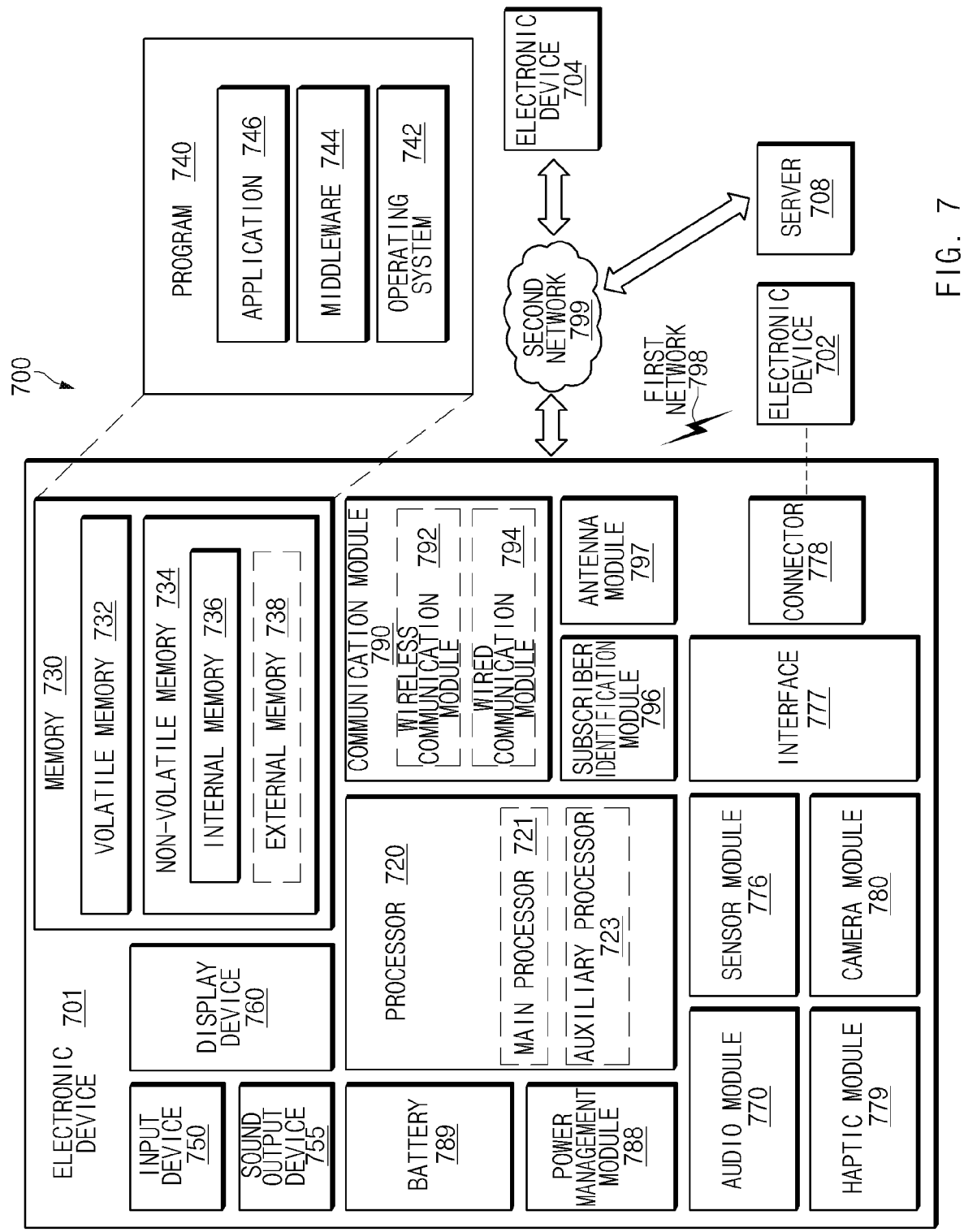
FIG. 7 is a block diagram illustrating an electronic device in a network environment according to various embodiments.

FIG. 7 is a block diagram illustrating an electronic device 701 in a network environment 700 according to various embodiments. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In some embodiments, at least one (e.g., the display device 760 or the camera module 780) of the components may be omitted from the electronic device 701, or one or more other components may be added in the electronic device 701. In some embodiments, some of the components may be implemented as single integrated circuitry. For example, the sensor module 776 (e.g., a fingerprint sensor, an iris sensor, or an illuminance sensor) may be implemented as embedded in the display device 760 (e.g., a display).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may load a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, a keyboard, or a digital pen (e.g., a stylus pen).

The sound output device 755 may output sound signals to the outside of the electronic device 701. The sound output device 755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to an embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to an embodiment, the audio module 770 may obtain the sound via the input device 750, or output the sound via the sound output device 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., PCB). According to an embodiment, the antenna module 797 may include a plurality of antennas. In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B. or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a housing including a first plate configured to face a first direction, a second plate configured to face a second direction opposite to the first direction, and a side member disposed in at least part of a peripheral region between the first plate and the second plate;
a touch screen display, at least part of the touch screen display exposed through the first plate of the housing;
a fingerprint sensor disposed in a lower portion of the touch screen display; and
a cover case coupled or integrated with at least part of the housing, the cover case configured to open or close to shield the first plate of the housing,
wherein an air gap is formed between a first region of the touch screen display that corresponds to the fingerprint sensor and a second region of the cover case that faces at least the first region, with the cover case closing the first plate of the housing.

2. The electronic device of claim 1, wherein the second region of the cover case includes an engraved region having a same area as an area of the first region of the touch screen display.

3. The electronic device of claim 2, wherein the first region of the touch screen display is located in a position spaced apart from a bottom of a screen region included in the touch screen display toward a top of the screen region by a specified distance, the first region of the touch screen display having an area ranging from 1% to 10% of a total area of the screen region.

4. The electronic device of claim 2, wherein, based on a screen region included in the touch screen display being divided at a specified ratio with respect to a specified direction, the first region of the touch screen display has, in a partial screen region by the division, an area ranging from 10% to 90% of a total area of the screen region.

5. The electronic device of claim 2, wherein the first region of the touch screen display has an area ranging from 90% to 100% of a total area of a screen region included in the touch screen display.

6. An electronic device comprising:
a housing including a first plate configured to face a first direction, a second plate configured to face a second direction opposite to the first direction, and a side member disposed in at least part of a peripheral region between the first plate and the second plate;
a touch screen display, at least part of the touch screen display exposed through the first plate of the housing;
a fingerprint sensor disposed in a lower portion of the touch screen display and configured to obtain fingerprint information;
a cover case coupled or integrated with at least part of the housing and configured to open or close to shield the first plate of the housing;
a sensor module;
communication circuitry; and
a processor electrically connected with the touch screen display, the fingerprint sensor, the sensor module, and the communication circuitry,
wherein the processor is configured to:
determine whether specified data is received from the cover case via the communication circuitry;
determine, based on the determination as to whether the specified data is received, whether the cover case makes contact with one region of the touch screen display that corresponds to the fingerprint sensor based on cover case closing the first plate of the housing;
determine whether the cover case is in an open state or a closed state, based on information sensed through the sensor module; and
decide a time to obtain specified information using the fingerprint sensor, based on the determination as to whether the cover case makes contact with the one region of the touch screen display and the determination as to whether the cover case is in the open state or the closed state.

7. The electronic device of claim 6, wherein, based on no object being brought into contact with the on region of the touch screen display, the specified information includes background information obtained based on transmission of sound waves in a specified frequency band and receipt of response signals of the sound waves by the fingerprint sensor.

8. The electronic device of claim 6, wherein the processor is further configured to determine that the cover case is not brought into contact with the one region of the touch screen display in a closed state based on the processor receiving the specified data from the cover case.

9. The electronic device of claim 8, wherein the processor is further configured to decide the time to obtain the specified information to be the time when the cover case is in a closed state based on the processor receiving the specified data from the cover case.

10. The electronic device of claim 6, wherein the processor is further configured to determine that the cover case is brought into contact with the one region of the touch screen display in a closed state based on the processor not receiving the specified data from the cover case.

11. The electronic device of claim 10, wherein the processor is further configured to decide the time to obtain the specified information to be the time when the cover case is changed from a closed state to an open state based on the processor not receiving the specified data from the cover case.

12. The electronic device of claim 6, wherein the processor is further configured to obtain the specified information by controlling driving of the fingerprint sensor at the decided time to obtain the specified information and generate or update a background image using the specified information obtained.

13. The electronic device of claim 12, wherein the processor is further configured to generate a fingerprint image using the fingerprint sensor and remove noise from the fingerprint image by comparing the fingerprint image and the background image.

14. The electronic device of claim 6, wherein the processor is configured to:
determine, through the sensor module, whether a temperature change greater than or equal to a specified threshold value is detected or whether a specified time period arrives; and
decide the time to obtain the specified information using the fingerprint sensor, based on an outcome of the determination.

15. A method for obtaining background information by an electronic device, the method comprising:
determining whether specified data is received from a cover case via communication circuitry, the cover case being coupled or integrated with at least part of a housing of the electronic device;
determining, based on the determination as to whether the specified data is received, whether the cover case makes contact with one region of a touch screen display based on the cover case closing a plate included in the housing;
determining whether the cover case is in an open state or a closed state, based on information sensed through a sensor module; and
deciding a time to obtain specified information using a fingerprint sensor, based on the determination as to whether the cover case makes contact with the one region of the touch screen display and the determination as to whether the cover case is in the open state or the closed state, wherein the fingerprint sensor is disposed in a lower region of the touch screen display that corresponds to the one region of the touch screen display.

16. The method of claim 15, further comprising:
based on no object being brought into contact with the one region of the touch screen display; and
obtaining background information as at least part of the specified information by transmitting sound waves in a specified frequency band and receiving response signals of the sound waves by the fingerprint sensor.

17. The method of claim 15, wherein the determining of whether the cover case makes contact with the one region of the touch screen display includes:
determining that the cover case is not brought into contact with the one region of the touch screen display in a closed state based on the specified data being received from the cover case; and
determining that the cover case is brought into contact with the one region of the touch screen display in a closed state, based on the specified data not being received from the cover case.

18. The method of claim 17, wherein the deciding of the time to obtain the specified information includes:
deciding the time to obtain the specified information to be the time when the cover case is in a closed state based on the determination that the cover case is not brought into contact with the one region of the touch screen display in the closed state; and
deciding the time to obtain the specified information to be the time when the cover case is changed from a closed state to an open state based on the determination that the cover case is brought into contact with the one region of the touch screen display in the closed state.

19. The method of claim 15, wherein the determining of whether the cover case is in the open state or the closed state includes at least one of:
determining that the cover case:
is in the open state, based on a brightness value sensed by an illuminance sensor being higher than or equal to a specified threshold value; and
is in the closed state based on the brightness value sensed by the illuminance sensor being lower than the specified threshold value;
determining that the cover case:
is in the open state based on no object being sensed by a proximity sensor or when an object beyond a specified distance range with respect to the proximity sensor is detected; and
determining that the cover case is in the closed state based on an object within the specified distance range from the proximity sensor being detected; or
determining that the cover case is in the open state based on a voltage change depending on a magnetic field not being sensed by a Hall sensor and determining that the cover case is in the closed state based on the voltage change depending on the magnetic field being sensed by the Hall sensor.

20. The method of claim 15, further comprising:
obtaining the specified information, based at least partly on determining the time to obtain the specified information,
wherein the obtaining of the specified information includes:
stopping obtaining the specified information based on contact of an object with the one region of the touch screen display being detected.

* * * * *